Sept. 4, 1934.  W. H. LARRABEE  1,972,525
FROSTPROOF WATER METER
Original Filed July 17, 1928
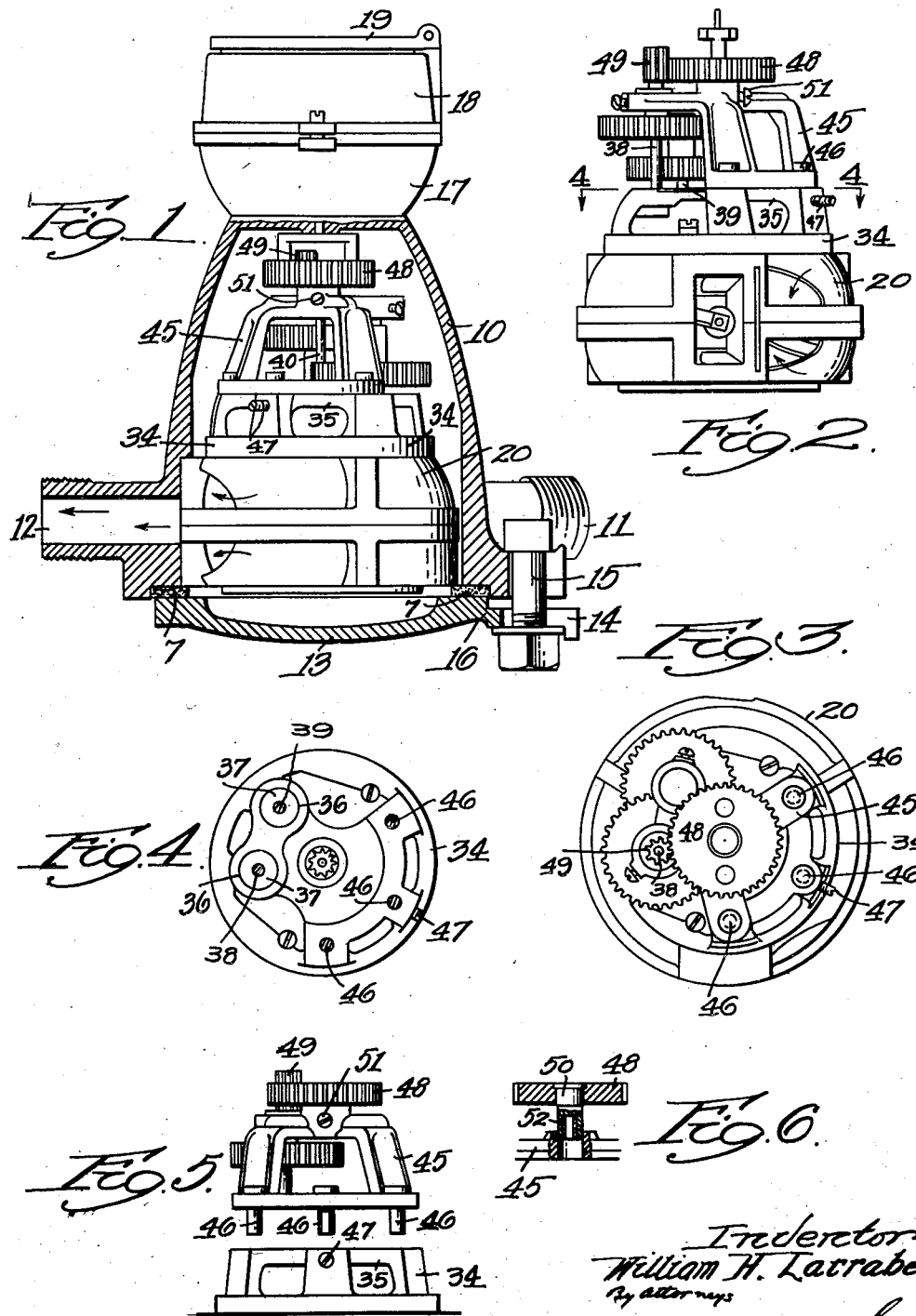
Inventor
William H. Larrabee
By attorneys Patented Sept. 4, 1934

1,972,525

UNITED STATES PATENT OFFICE 1,972,525

FROSTPROOF WATER METER

William H. Larrabee, Auburn, Mass., assignor to Union Water Meter Company, Worcester, Mass., a corporation of Massachusetts Original application July 17, 1928, Serial No. 293,470. Divided and this application January 11, 1932, Serial No. 585,952

1 Claim. (Cl. 73—98)

This is a division of my application Serial No. 293,470, filed July 17, 1928.

The principal objects of this invention are to connect the upper and lower frames by vertically slidable pins, one of which is held rigid under ordinary circumstances by a small screw by frictional contact with the pin so that when the pressure is excessive, as from ice, the pin will be capable of sliding under pressure and the frames will separate, thus preventing damage, and to provide a similar arrangement for holding the top gear for a similar purpose.

Other objects and advantages of the invention will appear hereinafter.

Reference is to be had to the accompanying drawing in which

Fig. 1 is a side view of a meter with parts in section on a diametrical line through the inlet and outlet;

Fig. 2 is a side view of the disc chamber and gearing;

Fig. 3 is a plan of the parts shown in Fig. 2;

Fig. 4 is a horizontal sectional view on the line 4—4 of Fig. 2;

Fig. 5 is a view of the means for supporting the gearing with the parts separated as in case of freezing, and Fig. 6 is a sectional view of the means for supporting the top gear and the bearing therefor.

This invention involves improvements in a well known type of meter and the elements of the meter are shown herein operating in general in the usual way, that is there is nothing new in the method of measuring the water in this case. The various features of this invention are shown as applied to the so-called King disc meter, which is of the positive measuring self-draining type.

As is usual, the meter comprises a casing 10, preferably of a non-rusting metal such as bronze, having an inlet 11 and an outlet 12. This casing is shown in this case as having its open bottom closed by a cast iron plate 13 which has frangible arms 14 slotted so as to connect them with an integral part of the casing by T-bolts 15. These arms have a thinned section at 16 so that in case of freezing one or more of these arms will break before any other part of the casing and can be replaced quickly and at small expense. This casing as usual has a flaring portion 17 at the top and a cap 18 which is provided with a pivoted cover 19 under which are the pointers and dial to be read to show the amount of water measured by the meter.

The bronze disc chamber 20 is placed in assembling with its outlet port registering with the outlet port of the casing. When the chamber is inserted in the casing, the chamber is held in place by means of the bottom plate and the gasket 7 which is supplied.

The parts above the disc chamber 20 are the intermediate lower frame 34 and an upper frame 45, both of bronze. The former is in the form of a ring, fastened to the top of the disc chamber. This frame has a web 35 across its top and two openings 36 therethrough provided with removable and replaceable hard rubber bushings 37 supporting a pair of shafts of monel or bronze 38 and 39 carrying gears of the gear train. These bushings, formed of hard rubber, are wear-resisting and prevent electric action between the two dissimilar metals.

The lower frame 34 and the upper frame 45 are connected together, for the sake of ease and simplicity of assembling and cheapness of manufacture and to avoid injury in case of freezing, by means of a plurality of pins 46, fixed to the upper frame but freely slidable in openings in the lower frame. They normally would allow these two frames to separate as indicated in Fig. 5 in case of ice pressure. One of these pins is held rigidly enough for ordinary operation by a small screw 47 which has frictional contact with the surface of the pin. However, in case of freezing or any excessive pressure, the screw will not prevent the frame 45 from separating from the other frame.

This frame 45 carries the gears heretofore mentioned and also the top gear 48 and its pinion 49. This top gear is mounted on a headed stud 50, which is also held by a screw 51 engaging it in frictional contact and allowing separation in case of freezing, as shown in Fig. 6. This stud is hollow and is provided with an internal rubber bushing 52 for receiving and steadying the top of the shaft 40.

It will be seen that I have provided improvements all tending to facilitate the separation of the parts automatically in case of freezing, without breaking the parts and to add to the ease of assembling and disassembling for repair, as well as to avoid the setting up of galvanic action between the dissimilar metals necessarily employed.

Although I have illustrated and described only one form of the invention, I am aware of the fact that modifications can be made therein by any person skilled in the art without departing from the scope of the invention as expressed in the claim. Therefore I do not wish to be limited in this respect but what I do claim is:—

In a water-meter, the combination with a casing, a disc chamber located in the bottom of the casing, an intermediate lower frame in the casing and immovably secured to the disc chamber above it, an upper frame in the casing, gearing of the meter carried by said upper frame, smooth vertical pins for connecting said upper frame to the lower frame, which pins are free to move upwardly in case of freezing, and a radial screw for temporarily holding one of the pins positively by frictional resistance under working conditions, whereby in case of freezing the upper frame can be forced away from the lower frame without breaking the parts.

WILLIAM H. LARRABEE.